United States Patent
Ong et al.

(10) Patent No.: US 11,242,770 B2
(45) Date of Patent: Feb. 8, 2022

(54) TURBINE CENTER FRAME AND METHOD

(71) Applicant: General Electric Company, Schenectady, NY (US)

(72) Inventors: Jonathan Ong, Bavaria (DE); Christian Thomas Wakelam, Bavaria (DE); Andreas Peters, Bavaria (DE)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 16/838,345

(22) Filed: Apr. 2, 2020

(65) Prior Publication Data

US 2021/0310376 A1 Oct. 7, 2021

(51) Int. Cl.
*F01D 25/24* (2006.01)
*F01D 25/28* (2006.01)

(52) U.S. Cl.
CPC ............. *F01D 25/24* (2013.01); *F01D 25/28* (2013.01)

(58) Field of Classification Search
CPC .................................. F01D 25/24; F01D 25/28
See application file for complete search history.

(56) References Cited

U.S. PATENT DOCUMENTS

| | | | |
|---|---|---|---|
| 8,061,980 B2 | 11/2011 | Praisner et al. | |
| 8,424,313 B1 | 4/2013 | Praisner et al. | |
| 8,517,686 B2 | 8/2013 | Allen-Bradley et al. | |
| 8,561,414 B1 | 10/2013 | Praisner et al. | |
| 8,572,943 B1 | 11/2013 | Sheridan | |
| 8,845,286 B2 | 9/2014 | Ramachandan et al. | |
| 8,915,090 B2 | 12/2014 | Praisner et al. | |
| 9,188,017 B2 | 11/2015 | Xu | |
| 9,212,558 B2 | 12/2015 | Praisner et al. | |
| 9,222,437 B2* | 12/2015 | Machnaim | B23P 11/00 |
| 10,221,770 B2 | 3/2019 | Sheridan | |
| 10,240,462 B2 | 3/2019 | Venugopal et al. | |
| 10,267,160 B2 | 4/2019 | Rice | |
| 2008/0138197 A1 | 6/2008 | Green et al. | |
| 2011/0123322 A1 | 5/2011 | Allen-Bradley et al. | |
| 2013/0051996 A1* | 2/2013 | Hoeger | F01D 9/041 415/185 |
| 2013/0192200 A1 | 8/2013 | Kupratis et al. | |
| 2013/0192201 A1 | 8/2013 | Kupratis et al. | |
| 2013/0192258 A1 | 8/2013 | Kupratis et al. | |
| 2013/0192266 A1 | 8/2013 | Houston et al. | |
| 2013/0259650 A1 | 10/2013 | Schwarz et al. | |
| 2013/0287545 A1 | 10/2013 | Suciu et al. | |
| 2013/0318998 A1 | 12/2013 | Schwarz et al. | |
| 2013/0330180 A1* | 12/2013 | Guendogdu | F01D 9/065 415/182.1 |
| 2014/0020404 A1 | 1/2014 | Sheridan et al. | |
| 2014/0090380 A1 | 4/2014 | Aggarwala et al. | |

(Continued)

FOREIGN PATENT DOCUMENTS

KR 1020110101982 A 9/2011

*Primary Examiner* — Igor Kershteyn
(74) *Attorney, Agent, or Firm* — McGarry Bair PC (57) ABSTRACT

Aspects of the disclosure generally relate to a turbine center frame for a turbine engine through which a flow path extends. The turbine center frame can include an inner wall radially spaced from an outer wall, with the inner and outer walls extending between an inlet and an outlet, and with the outlet downstream of the inlet with respect to the flow path. A set of circumferentially-spaced airfoils can extend between the inner wall and the outer wall.

18 Claims, 5 Drawing Sheets

(56) References Cited

U.S. PATENT DOCUMENTS

| | | | |
|---|---|---|---|
| 2014/0196472 A1 | 7/2014 | Kupratis et al. | |
| 2014/0196473 A1 | 7/2014 | Kupratis et al. | |
| 2014/0202133 A1 | 7/2014 | Praisner et al. | |
| 2014/0212284 A1 | 7/2014 | Jamison et al. | |
| 2015/0192070 A1 | 7/2015 | Kupratis et al. | |
| 2015/0192071 A1 | 7/2015 | Kupratis et al. | |
| 2017/0022835 A1* | 1/2017 | Clark | F01D 9/041 |
| 2017/0114796 A1 | 4/2017 | DiPietro, Jr. et al. | |
| 2017/0298747 A1* | 10/2017 | Hura | F04D 29/584 |
| 2018/0306041 A1* | 10/2018 | Peters | F01D 9/065 |
| 2019/0003325 A1* | 1/2019 | Kuchana | F01D 25/00 |
| 2019/0136702 A1* | 5/2019 | Kuchana | F01D 5/145 |
| 2019/0153940 A1* | 5/2019 | Deparis | B64D 29/06 |

* cited by examiner

TURBINE CENTER FRAME AND METHOD

TECHNICAL FIELD

The disclosure generally relates to a frame for a turbine engine, and more specifically to a turbine center frame and method of modifying an airflow in a turbine engine.

BACKGROUND

Turbine engines, and particularly gas or combustion turbine engines, are rotary engines that extract energy from a flow of combusted gases passing through the engine onto a multitude of rotating turbine blades.

Gas turbine engines can include a compressor that compresses an airflow and a turbine that drives the compressor utilizing the compressed airflow. The turbine can be separated into a high pressure turbine and a low pressure turbine, with a turbine center frame positioned between the two serving as a duct for fluid flowing from the high pressure turbine to the low pressure turbine. The turbine center frame can provide for modifying the fluid flow between the high pressure turbine and the low pressure turbine.

BRIEF DESCRIPTION

Aspects and advantages of the invention will be set forth in part in the following description, or may be obvious from the description, or may be learned through practice of the invention.

In one aspect, the disclosure relates to a turbine center frame for a turbine engine through which a flow path extends. The turbine center frame includes an inner wall radially spaced from an outer wall, with the inner and outer walls extending between an inlet and an outlet, with the outlet downstream of the inlet with respect to the flow path, a set of circumferentially-spaced airfoils extending between the inner wall and the outer wall, a first cross-sectional area defined along the flow path between the inner and outer walls, a second cross-sectional area greater than the first cross-sectional area and defined along the flow path between the inner and outer walls downstream of the first cross-sectional area, and a third cross-sectional area defined along the flow path between the inner and outer walls downstream of the second cross-sectional area.

In another aspect, the disclosure relates to a turbine engine. The turbine engine includes an engine core including a compressor section, a combustion section, and a turbine section in axial flow arrangement defining a flow path, with the turbine section including a high pressure turbine and a low pressure turbine, and a turbine center frame extending from the high pressure turbine to the low pressure turbine, the turbine center frame including an inner wall radially spaced from an outer wall, with the inner and outer walls extending between an inlet and an outlet, with the outlet downstream of the inlet with respect to the flow path, a set of circumferentially-spaced airfoils extending between the inner wall and the outer wall, a first cross-sectional area defined radially between the inner and outer walls, a second cross-sectional area larger than the first cross-sectional area and defined radially between the inner and outer walls downstream of the first cross-sectional area, and a third cross-sectional area defined radially between the inner and outer walls downstream of the second cross-sectional area.

In yet another aspect, the disclosure relates to a method of modifying an airflow along a flow path extending through a turbine center frame for a turbine engine. The method includes directing the airflow along the flow path at a first velocity through a first cross-sectional area of the turbine center frame, slowing the airflow to a second velocity, less than the first velocity, by flowing the airflow through a second cross-sectional area of the turbine center frame greater than the first cross-sectional area, and speeding up the airflow to a third velocity, greater than the second velocity, by flowing the airflow through a third cross-sectional area of the turbine center frame.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which.

DETAILED DESCRIPTION OF THE INVENTION

Aspects of the disclosure described herein are broadly directed to a turbine frame and its operation and manufacture. For the purposes of illustration, one exemplary environment within which the frame can be utilized will be described in the form of a turbine engine having a turbine center frame positioned between a high pressure turbine and a low pressure turbine. Such a turbine engine can be in the form of a gas turbine engine, a turboprop, a turboshaft, or a turbofan engine, in non-limiting examples. It will be understood, however, that aspects of the disclosure described herein are not so limited and can have general applicability within other engine systems. For example, the disclosure can have applicability for systems in other engines or vehicles, and may be used to provide benefits in industrial, commercial, and residential applications.

Turbine center frames (also known as turbine mid frames) are typically utilized in a transitional duct between high and low pressure turbines. Such frames can provide for diffusing or smoothing of a turbulent airflow exiting the high pressure turbine before entering the low pressure turbine. The airflow entering turbine center frames can have unsteady, three-dimensional and non-uniform turbulent motion. These flow characteristics typically lead to high levels of mixing and poor performance. Such frames typically include airfoils to divide, turn, or accelerate the airflow. Accelerating the airflow can aid in reducing such turbulence, and can be accomplished by redirecting the airflow along a turning airfoil. Turbulence reduction can also be accomplished by accelerating the airflow through the frame. For example, a typical minimum level of acceleration across turning vanes is typically 20% between an inlet and an outlet. If the airflow acceleration is too small, the levels of 3D endwall flows typically increase, with high levels of turbulence in the airflow. Engine performance can decrease as a result.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, fixed, connected, joined, and the like) are to be construed broadly and can include intermediate members between a collection of elements and relative movement between elements unless otherwise indicated. As such, connection references do not necessarily infer that two elements are directly connected and in fixed relation to one another. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The exemplary drawings are for purposes of illustration only and the dimensions, positions, order and relative sizes reflected in the drawings attached hereto can vary.

Figure 1:
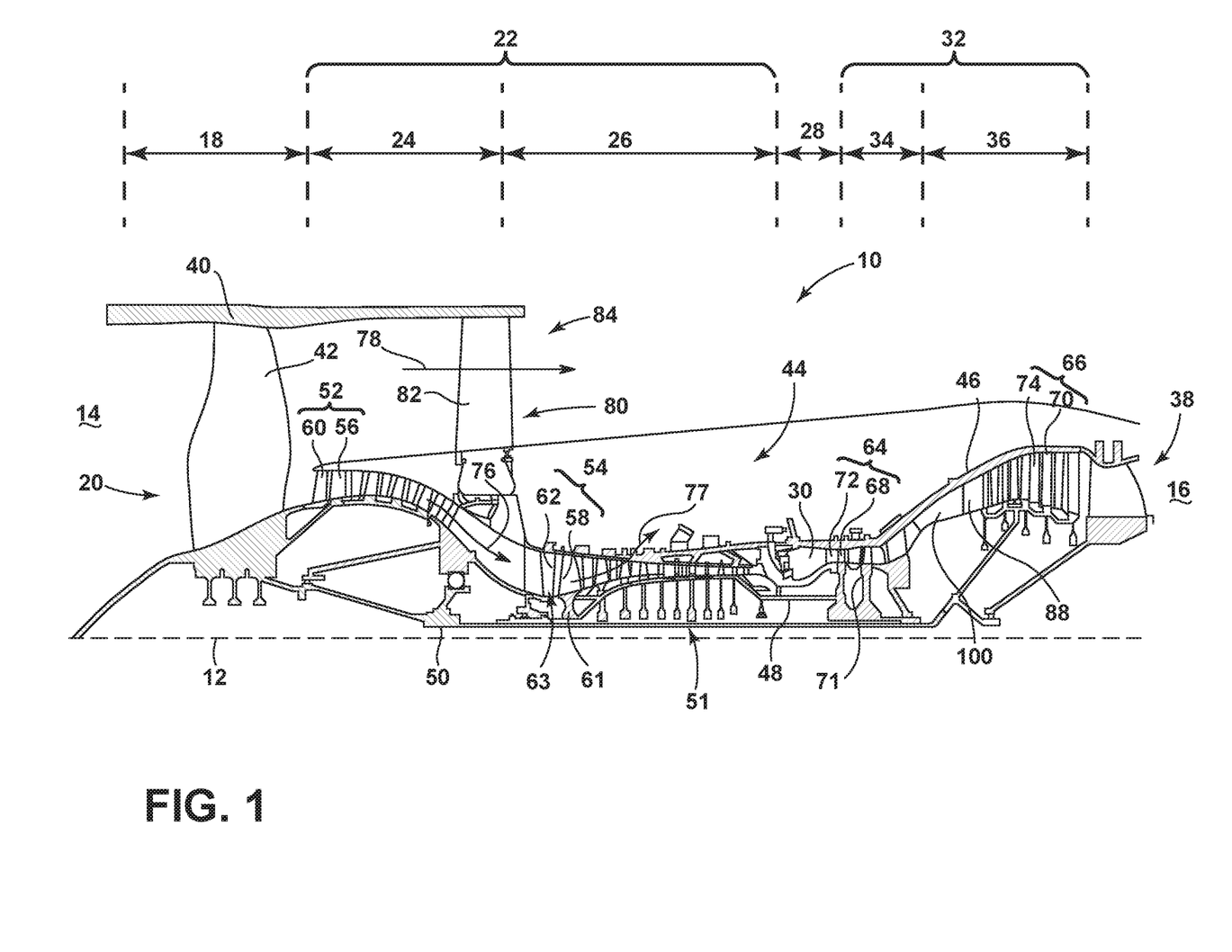
FIG. 1 is a schematic cross-sectional diagram of a gas turbine engine for an aircraft including an exemplary turbine center frame in accordance with various aspects described herein.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air to the HP compressor 26, which further pressurizes the air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36 defining a mainstream flow 76 through the turbine section 32, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow can be drawn from the compressor section 22 as bleed air 77. The bleed air 77 can be drawn from the pressurized airflow and provided to engine components requiring cooling. The temperature of pressurized airflow entering the combustor 30 is significantly increased above the bleed air temperature. The bleed air 77 may be used to reduce the temperature of the core components downstream of the combustor.

A remaining portion of airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

A turbine center frame 100 can be provided between the HP turbine 34 and the LP turbine 36. The turbine center frame 100 can be part of a transition duct 88 provided between the HP turbine 34 and the LP turbine 36. As such, the turbine center frame 100 can extend between an inlet 120 (FIG. 2) at the aft end of the HP turbine 34 and terminate in an outlet 122 at the forward end of the LP turbine 36. The turbine center frame 100 can provide for fluidly coupling the HP turbine 34 to the LP turbine 36. In addition, the turbine center frame 100 can modify a flow of fluid exhausting from the HP turbine 34, such as by diffusing, smoothing, accelerating, or reducing turbulence. For example, the turbine center frame 100 can turn the flow tangentially or perpendicularly relative to the engine centerline 12. Such a turn in flow can reduce three-dimensional or turbulent airflows from the HP turbine 34 and provide for a more smooth airflow into the LP turbine 36, thereby allowing the LP turbine 36 to extract more work from the airflow. The turbine center frame 100 can further act as a structural member for supporting pass tubing, secondary flow systems, or lubrication systems, in non-limiting examples.

Figure 2:
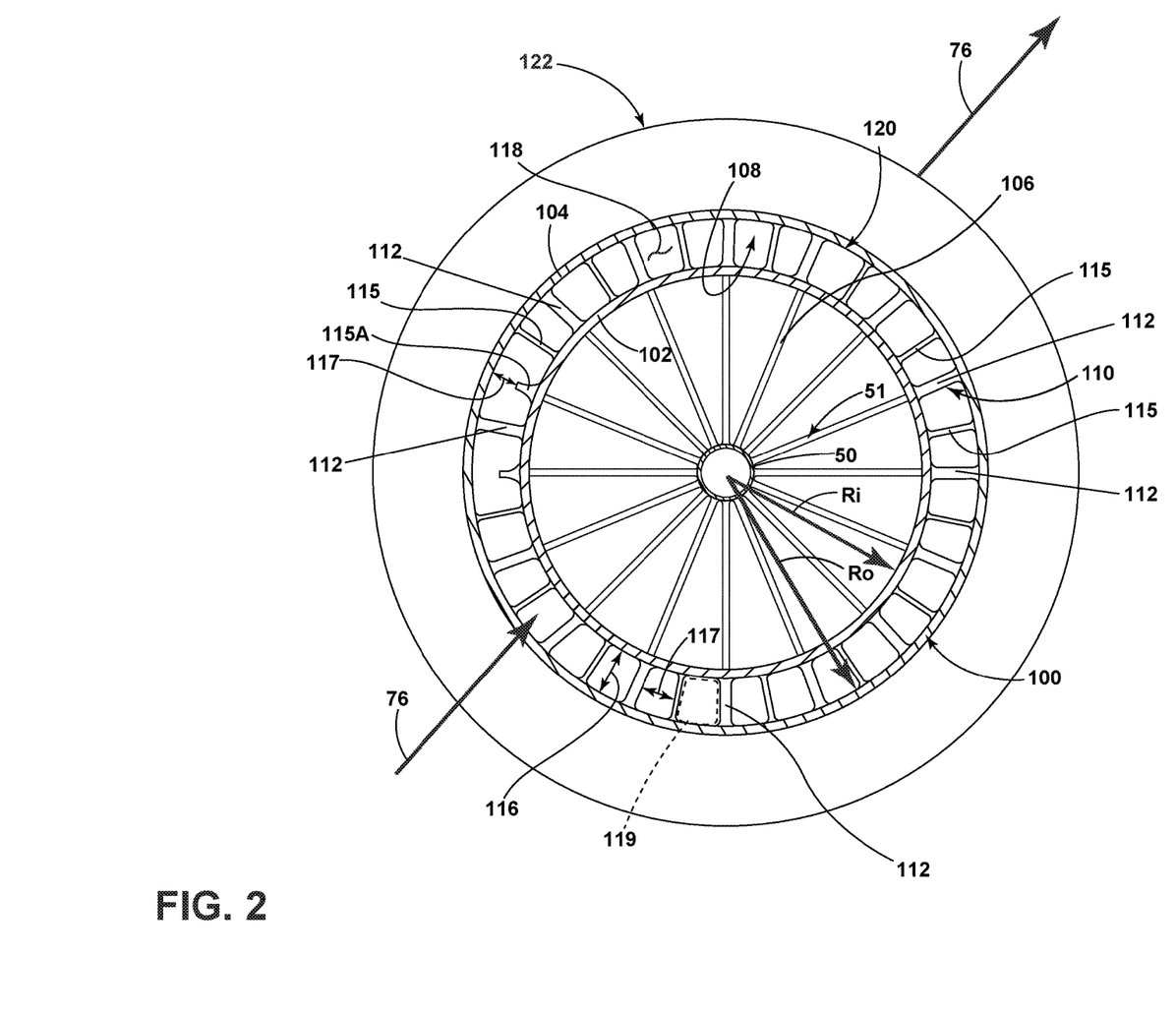
FIG. 2 is a cross-sectional view of the turbine center frame of FIG. 1 along line II-II.

FIG. 2 is a view of the turbine center frame 100 looking at the inlet 120 toward the outlet 122. The turbine center frame 100 includes an inner wall 102 spaced radially from an outer wall 104. In one non-limiting example, the core casing 46 of FIG. 1 can at least partially form the outer wall 104, and the stator 63 of FIG. 1 can at least partially form the inner wall 102. In one example, the inner and outer walls 102, 104 can be axially or circumferentially continuous to form the turbine center frame 100. In another example, the inner wall 102 or outer wall 104 can be made of multiple axial or circumferential wall segments coupled together to form the turbine center frame 100.

Exemplary rotor elements 106 are illustrated as forming a portion of the rotor 51. The rotor elements 106 can have any suitable size, shape, or orientation within the engine 10. For example, the rotor elements 106 can extend from the LP spool 50 to other rotor 51 components of the engine 10, such as the LP turbine blades 70 of FIG. 1. (FIG. 1).

An annular flow path 108 can be defined between the inner and outer walls 102, 104. In the illustrated view, the flow path 108 defines a flow direction extending into the page. In operation, the mainstream flow 76 can move along the flow path 108 through the inlet 120 and out of the outlet 122.

A set 110 of airfoils 112 are arranged circumferentially around the turbine center frame 100 extending between the inner and outer walls 102, 104. While illustrated as being evenly spaced about the turbine center frame 100, any number of airfoils 112 can be utilized and can also be arranged in any suitable pattern, including a varied spacing between adjacent airfoils 112, or multiple rows or groups of airfoils 112.

Furthermore, the airfoils 112 are schematically illustrated as being aligned radially relative to the engine centerline for the purposes of visual clarity. It will be understood that the airfoils 112 can be angled or leaned tangentially toward the engine centerline, or be positioned within the turbine center frame 100 in any other form or orientation resultant of a desired aerodynamic design or analysis. Further still, the airfoils 112 can include a bow or sweep, or any suitable curvature along the body of the airfoils 112. It is contemplated that a shape or orientation of the airfoils 112 can turn a flow of fluid, such as the mainstream flow 76, passing through the turbine center frame 100 along the airfoils 112.

The turbine center frame 100 can further include a splitter 115. In the example shown, multiple splitters 115 are provided with one splitter 115 positioned between adjacent airfoils 112. The splitters 115 can have any suitable shape or geometric profile, including an airfoil profile. In the illustrated example, the splitters 115 extend from the inner wall 102 to the outer wall 104. In addition, a second splitter 115A extends from the inner wall 102 to define a gap 117 with the outer wall 104, with a splitter 115 and second splitter 115A being positioned between adjacent airfoils 112. Additionally or alternatively, splitters can extend from the outer wall 104 to form a gap (not shown) with the inner wall 102.

Furthermore, while the splitters 115 are illustrated as having a smaller or thinner profile compared to the airfoils 112, such a profile is shown merely for visual distinction between the airfoils 112 and splitters 115 and is not intended to limit a geometry of the splitters 115. It will be understood that a splitter 115 can have an identical geometric profile or shape compared to an airfoil 112, or have a wider profile, or have a longer or shorter axial length compared to an airfoil 112. Such a splitter 115 can be utilized to divide or redirect airflows between adjacent airfoils 112 in the set 110. Furthermore, the orientations, patterns, shapes, curvatures, or spacing can vary between the airfoils 112 and splitters 115. Any arrangement, pattern, orientation, or grouping of splitters 115 and airfoils 112 can be utilized in the turbine center frame 100.

One exemplary height or spacing distance 116 can be measured between the inner wall 102 and the outer wall 104, extending in the radial direction relative to the engine centerline 12 (FIG. 1). As used herein, "height" will be considered as synonymous with a spacing distance between the inner wall 102 and outer wall 104. In addition, one exemplary spacing width 117 is illustrated between an airfoil 112 and adjacent splitter 115 as shown. It will be understood that the spacing width 117 can be defined between two adjacent airfoils 112 with no splitter therebetween, or between two adjacent splitters 115, or between any two circumferentially-adjacent airfoils or splitters within the turbine center frame 100.

An exemplary annular cross-sectional area 118 can be defined as an annulus area taken at any location between the inlet 120 and the outlet 122 including at the inlet 120 and the outlet 122. In other words, the annulus area may be evaluated using $\pi*(Ro^2-Ri^2)$. It will be understood that the cross-sectional area 118 can vary at different locations along the flow path 108. For example, the cross-sectional area 118 can increase or decrease when moving along the flow path 108, such as into or out of the page as shown in FIG. 2. It should be understood that a partial cross-sectional area 119 representing part of a path along which the mainstream flow 76 actually travels would be different from the annular cross-sectional area 118 depending on the flow swirl angle and blockage. The partial cross-sectional area 119 can be at least partially formed by the spacing width 117 and the spacing distance 116 and can define an effective flow area. In addition, the partial cross-sectional area 119 can be increased or decreased by varying either or both of the spacing distance 116 and spacing width 117, or by altering the level of swirl (or flow turning) within the flowpath.

Figure 3:
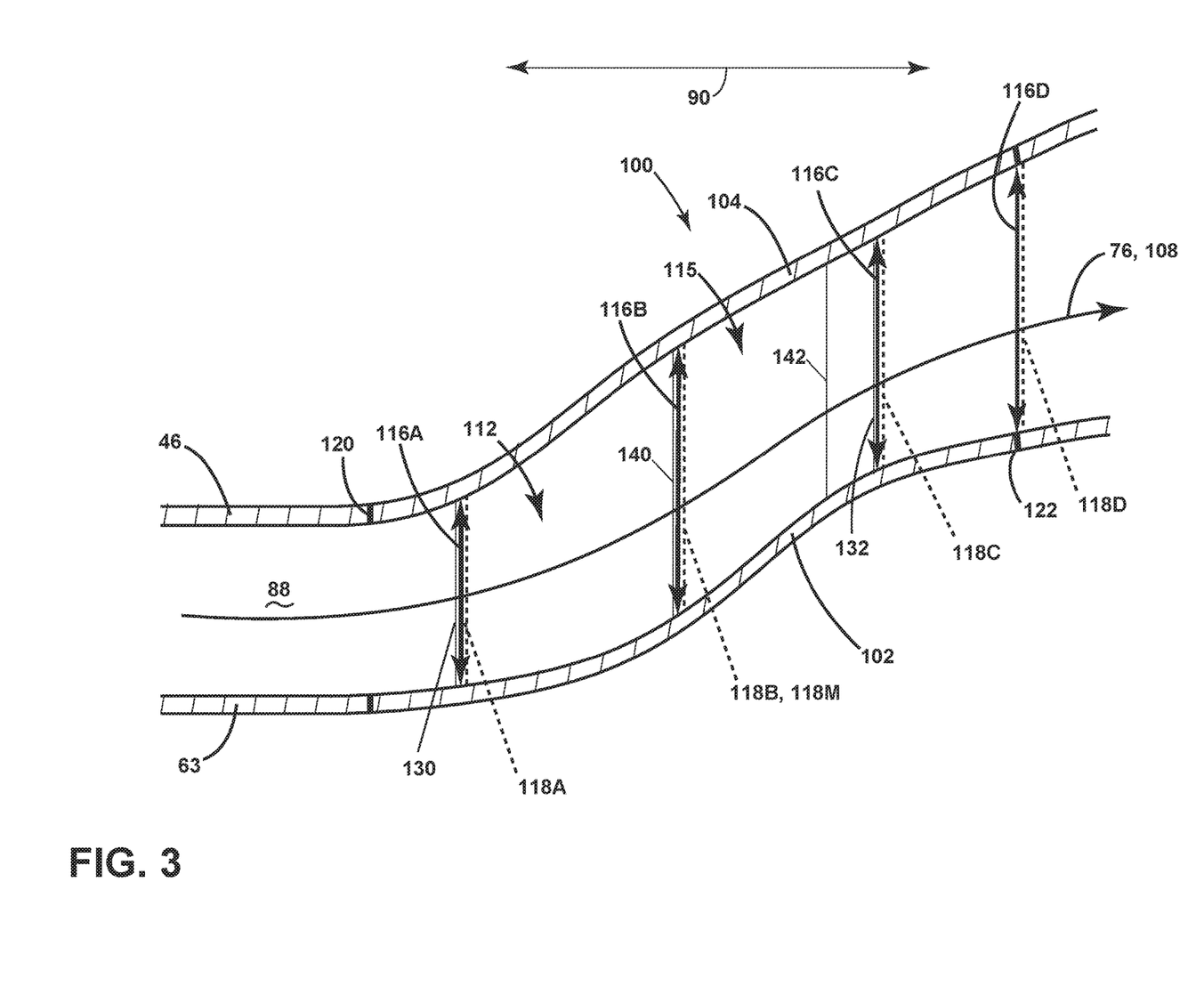
FIG. 3 is a side view of the turbine center frame of FIG. 1 illustrating an inner wall and outer wall.

Turning now to FIG. 3, a side view of the transition duct 88 and turbine center frame 100 is shown with the mainstream flow 76 moving along the flow path 108. An axial direction 90 is indicated for reference. The axial direction 90 can be parallel to the engine centerline 12 (FIG. 1). In the example shown, the inner and outer walls 102, 104 extend axially between the inlet 120 and the outlet 122 to the turbine center frame 100. The airfoil 112 extends from a leading edge 130 to a trailing edge 132. In the example shown, the leading edge 130 is positioned downstream of the inlet 120, and the trailing edge 132 is positioned upstream of the outlet 122 with respect to the flow path 108. It is contemplated that the leading and trailing edges 130, 132 can be aligned with, positioned upstream of, or positioned downstream of the respective inlet 120 and outlet 122.

The splitter 115 also extends from a splitter leading edge 140 to a splitter trailing edge 142. In the example shown, the splitter 115 extends fully from the inner wall 102 to the outer wall 104, with the splitter leading and trailing edges 140, 142 both positioned between the airfoil 112 leading edge 130 and trailing edge 132. It is also contemplated that either or both of the splitter leading edge 140 and splitter trailing edge 142 can be positioned between the inlet 120 and outlet 122 based on a function of an axial width of the splitter 115. In a non-limiting example, the splitter trailing edge 142 can be spaced apart from the trailing edge 132 of the airfoil 112 by a distance between 5-20% of the axial width of the splitter 115.

A first height 116A, a second height 116B, and a third height 116C can be defined radially between the inner and outer walls 102, 104 as shown. A first cross-sectional area 118A, a second cross-sectional area 118B, and a third cross-sectional area 118C, each indicated in dashed line, can also be defined along the flow path 108 between the inner and outer walls 102, 104. It should be understood that while only shown as partial cross-sectional areas, the first, second, and third cross-sectional areas 118A, 118B, and 118C are each the exemplary annular cross-sectional area 118 as described herein and can be at least partially formed by the respective first, second, and third heights 116A, 116B, 116C. It should be understood that the view of FIG. 3 is perpendicular to that of FIG. 2, such that a dashed outline indicating the exemplary partial cross-sectional area 119 of FIG. 2 is viewed "edge-on" to form the dashed-line views of the first, second, and third cross-sectional areas 118A, 118B, 118C of FIG. 3.

In the example shown, the first height 116A is located at the inlet 120 to the turbine center frame 100. For visual clarity, the inlet 120 is illustrated as being slightly spaced from the first height 116A, and it should be understood that the inlet 120 can coincide with both the first height 116A and first cross-sectional area 118A.

In addition, the second height 116B and second cross-sectional area 118B can be defined at the splitter leading edge 140. Once again, the second height 116B, second cross-sectional area 118B, and splitter leading edge 140 are illustrated as being slightly spaced apart merely for visual clarity. The second cross-sectional area 118B is located downstream of the first cross-sectional area 118A with respect to the flow path 108. The second height 116B can be larger than the first height 116A. For example, the second height 116B can be between 1.1 and 2.0 times larger than the first height 116A, including between 1.3 and 1.5 times larger than the first height 116A.

Further, the third height 116C and third cross-sectional area 118C can be defined at or near the trailing edge 132 of the airfoil 112. Once again, the third height 116C, third cross-sectional area 118C, and outlet 122 are illustrated as being slightly spaced apart for visual clarity. The third cross-sectional area 118C is located downstream of the second cross-sectional area 118B with respect to the flow path 108. The third height 116C can be between 0.5 and 1.5 times the second height 116B, including between 0.8 and 1.1 times the second height 116B.

It is further contemplated that other portions of the transition duct 88 can form a height or cross-sectional area in concert with the turbine center frame 100 to modify or tailor the mainstream flow 76 along the flow path 108. In the illustrated example, a fourth height 116D is defined within the transition duct 88 between the core casing 46 and stator 63 downstream of the third height 116C. The fourth height 116D can be defined at or near the outlet 122 of the turbine center frame 100. The fourth height 116D can be greater than, less than, or equal to the third height 116C. In a non-limiting example, the fourth height 116D can be between 0.8 and 1.5 times the third height 116C, including between 1.0 and 1.3 times the third height 116C. Furthermore, the fourth height 116D can at least partially form a fourth cross-sectional area 118D as shown. The fourth cross-sectional area 118D can be of any suitable size, including greater than, less than, or equal to the third cross-sectional area 118C. In this manner, the mainstream flow 76 can be sped up, slowed, or turned downstream of the outlet 122. Still further, the second cross-sectional area 118B can be larger than the first cross-sectional area 118A, and greater than or equal to the third cross-sectional area 118C.

Figure 4:
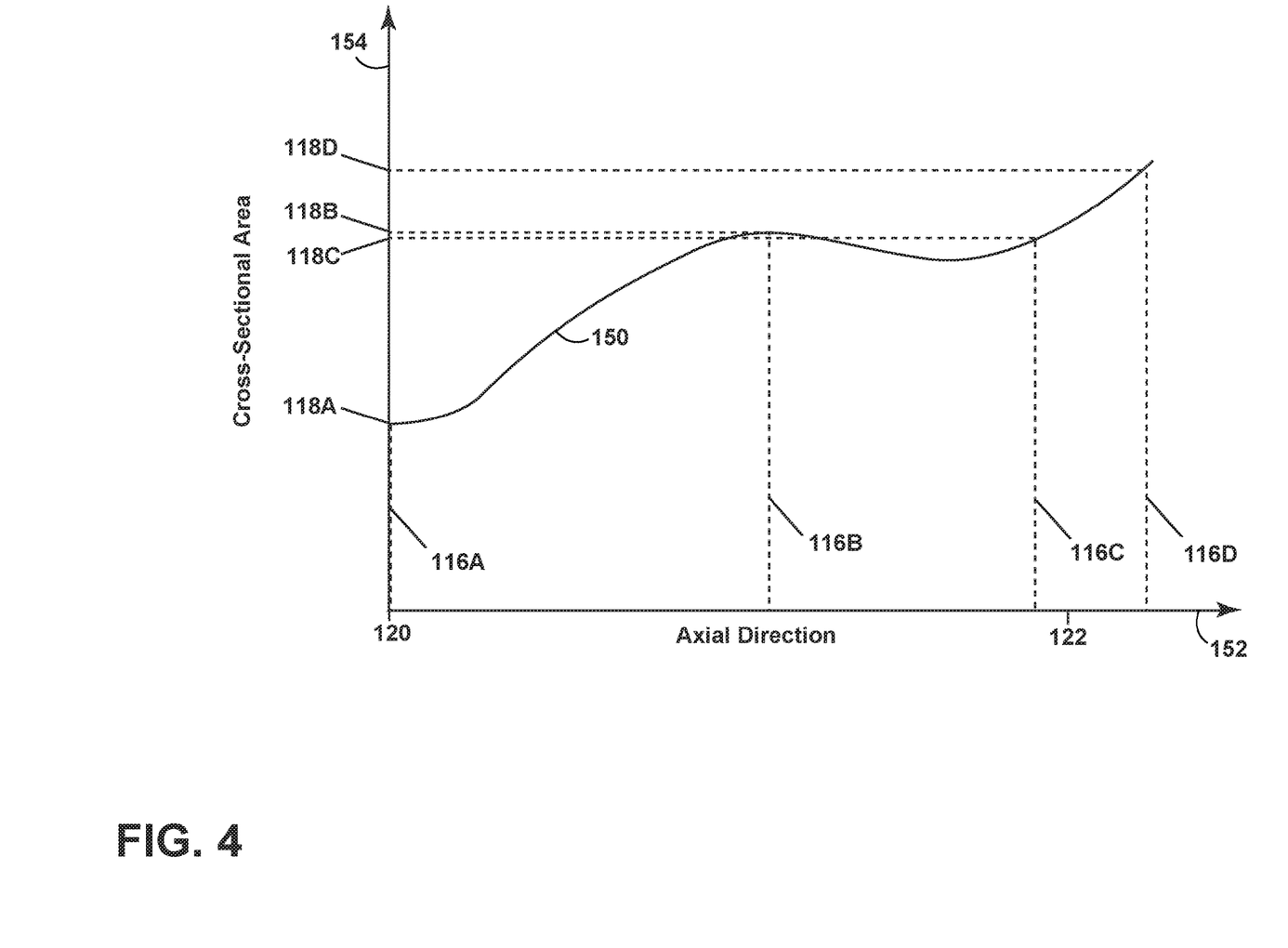
FIG. 4 is a plot illustrating a cross-sectional area through the turbine center frame of FIG. 1.

Referring now to FIG. 4, a plot 150 is shown that schematically illustrates one exemplary cross-sectional profile through the turbine center frame 100 along the flow path 108 (FIG. 3). The axial direction 90 (FIG. 3) is indicated on a horizontal axis 152, and the cross-sectional area through the turbine center frame 100 and transition duct 88 is indicated on a vertical axis 154. The axial locations of the first, second, third, and fourth heights 116A, 116B, 116D, 116D are indicated on the horizontal axis 152, and the corresponding first, second, third, and fourth cross-sectional areas 118A, 118B, 118C, 118D are indicated on the vertical axis 154.

It is contemplated that the cross-sectional area through the turbine center frame 100 can increase or decrease between the indicated heights 116A, 116B, 116C, 116D. In the illustrated example, the cross-sectional area through the turbine center frame 100 can decrease and then increase when moving axially from the second height 116B to the third height 116C, such that the second and third cross-sectional areas 118B, 118C can be approximately the same size, such as within 10%. Such an increase or decrease in cross-sectional area can be formed by varying a height between the inner and outer walls 102, 104 (FIG. 2).

In one non-limiting example, and the ratio of the third cross-sectional area 118C to the second cross-sectional area 118B is less than 1.1 (118C/118B<1.1).

In the illustrated example, the second cross-sectional area 118B can be larger than the first cross-sectional area 118A. In a non-limiting example, the second cross-sectional area 118B can be between 1.0 and 2.0 times the first cross-sectional area 118A, including greater than 1.5 times the first cross-sectional area 118A, where the ratio of the second cross sectional area 118B to the first cross-sectional area 118A is greater than 1.5 (118B/118A>1.5)

The third cross-sectional area 118C can be less than or equal to the second cross-sectional area 118B as illustrated, however it is also contemplated that the third cross-sectional area is slightly greater than the second cross-sectional area. In a non-limiting example, the third cross-sectional area 118C can be between 0.3 and 1.5 times the second cross-sectional area 118B, including between 0.5 and 1.1 times the second cross-sectional area 118B, where the ratio of the third cross-sectional area 118C to the second cross-sectional area 118B is less than 1.1 (118C/118B<1.1).

It is further contemplated that the third cross-sectional area 118C can be between 1.0 and 2.0 times the first cross-sectional area 118A, including between 1.0 and 1.8 times the first cross-sectional area 118A. It is further contemplated that the third cross-sectional area 118C is even more than 2.0 times the first cross-sectional area 118A. In still another example, the fourth cross-sectional area 118D within the transition duct 88 can be between 1.0 and 3.0 times the first cross-sectional area 118A in the turbine center frame 100.

Figure 5:
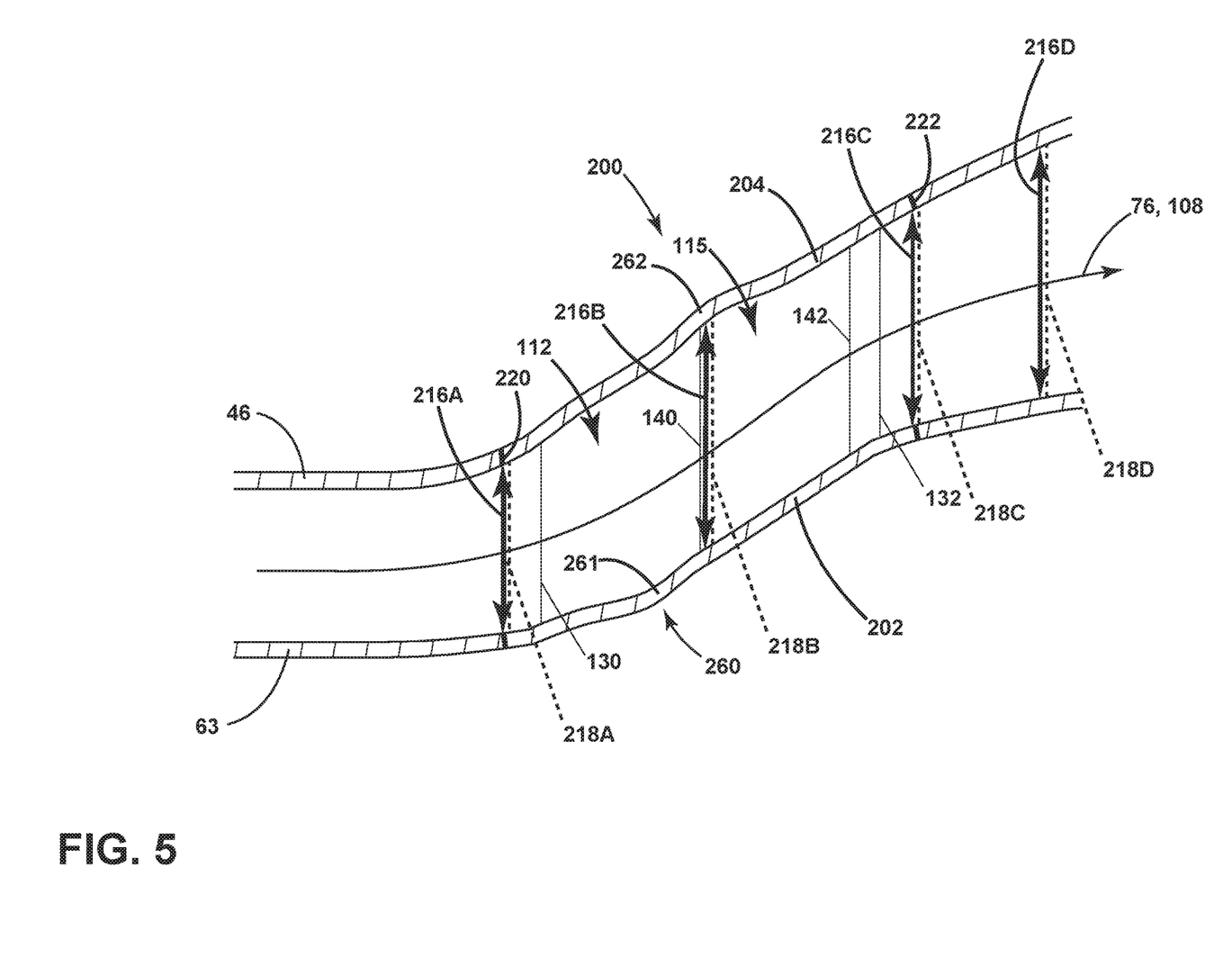
FIG. 5 is a side view of another turbine center frame that can be utilized in the turbine engine of FIG. 1 illustrating an inner wall and outer wall having a local contour.

Referring now to FIG. 5, another turbine center frame 200 is illustrated that can be utilized in the turbine engine 10. The turbine center frame 200 is similar to the turbine center frame 100; therefore, like parts will be identified with like numerals increased by 100, with it being understood that the description of the like parts of the turbine center frame 100 applies to the turbine center frame 200, except where noted.

The turbine center frame 200 includes an inner wall 202 and outer wall 204 extending from an inlet 220 to an outlet 222. An airfoil 112 and a splitter 115 extend between the inner wall 202 and outer wall 204 as described above. First, second, third, and fourth heights 216A, 216B, 216C, 216D are defined between the inner and outer walls 202, 204, and corresponding first, second, third, and fourth cross-sectional areas 218A, 218B, 218C, 218D are formed within the turbine center frame 200 and transition duct 88 as described above.

The first height 216A is defined at the leading edge 130 of the airfoil 112, the second height 216B is defined at the splitter leading edge 140, the third height 216C is defined at the outlet 222, and the fourth height 216C is defined in the transition duct 88 downstream of the outlet 222 as shown. One difference compared to the turbine center frame 100 is that the leading edge 130 of the airfoil 112 is located at the inlet 220 to the turbine center frame 200. The first height 216A is therefore also defined at the inlet 220 as shown.

Another difference is that at least one of the inner wall 202 and outer wall 204 can include at least one local contour 260. In the example shown, a first local contour 261 is in the form of a convex bulge that narrows the flow path 108 downstream of the splitter leading edge 130. A second local contour 262 is in the form of a concave bulge that expands the flow path 108 at the second height 216B. The second local contour 262 also forms the second cross-sectional area 218B as shown. Multiple local contours 260 can be provided along the inner wall 202 or outer wall 204 to locally increase or decrease a cross-sectional area through the turbine center frame 200 and tailor the mainstream flow 76 through the transition duct 88. In this manner, the at least one local contour 260 can form at least one of the first, second, or third cross-sectional areas 218A, 218B, 218D.

It can be appreciated that the velocity of the mainstream flow 76 can increase or decrease in proportion to the size of the cross-sectional area through the turbine center frame 100 or transition duct 88. For example, the second cross-sectional area 118B, 218B being larger than the first cross-sectional area 118A, 218B can cause a velocity reduction in the mainstream flow 76 in the region of the second height 116B, 216B, such as at the leading edge of the splitter 115. In one example, the second cross-sectional area 118B, 218B can define the maximum cross-sectional area 118M such that the mainstream flow 76 has a minimum velocity at the maximum cross-sectional area 118M. In addition, the third cross-sectional area 118C, 218C being smaller than the second cross-sectional area 118A, 218A can cause a velocity increase in the mainstream flow 76 across the splitter 115 and toward the outlet 122, 222. It is contemplated that the velocity of the mainstream flow 76 at the outlet 122, 222 can be between 80% and 125% of the velocity of the mainstream flow 76 at the inlet 120, 220 while still providing for the desired airflow smoothing or diffusing through the turbine center frame 100, 200. Such a low overall acceleration or change in velocity can be achieved in part due to the slowing of the airflow prior to encountering the splitter 115, in contrast to traditional turbine center frames having a progressive or gradual increase in velocity across the entire frame.

The above described aspects provide for a method of modifying an airflow along a flow path extending through a turbine center frame through a turbine engine, such as the mainstream flow 76 along the flow path 108 through the turbine center frame 100, 200. The method includes directing the airflow along the flow path at a first velocity through a first cross-sectional area of the turbine center frame, such as the first cross-sectional area 118A, 218A. For example, the airflow can be directed at the first velocity past the leading edge 130 of the airfoil 112 within the turbine center frame 100, 200. The method also includes slowing the airflow to a second velocity, less than the first velocity, via the second cross-sectional area 118B, 218B greater than the first cross-sectional area 118A, 218A. Slowing the airflow can also include slowing the airflow to a minimum velocity within the turbine center frame 100, 200 by flowing the airflow through a maximum cross-sectional area 118M within the turbine center frame 100. The method further includes speeding up the airflow to a third velocity, greater than the second velocity, via the third cross-sectional area 118C, 218C greater than or equal to the first cross-sectional area 118A, 218A. Speeding up the airflow can further include speeding up the airflow to the third velocity at an outlet 122, 222 to the turbine center frame 100, 200. In addition, the method can further include dividing the airflow past the splitter 115 located along the flow path 108. It can be appreciated that modifying the airflow can include speeding up, slowing down, or turning the airflow, such as via the geometry or arrangement of the airfoils 112, splitters 115, inner wall 102, 202, or outer wall 104, 204.

The above described aspects provide for a variety of benefits. For example, the varying cross-sectional area through the turbine center frame can provide for a lower overall increase in velocity across the frame compared to traditional turbine center frames, including even a reduction in velocity at the outlet compared to the inlet. An overall velocity increase of less than 20% are known to have engine performance losses from excessive 3D endwall flows and turbulence within the airflow. The turbine center frame described herein can operate without such performance losses even at low overall airflow accelerations, or even with no acceleration or a velocity reduction, due at least to the airflow slowing at the second height location and speeding up toward the third height location. The greater acceleration across the splitter compared to traditional turbine center frames provides for improved turbulence reduction and airflow smoothing without need of a large overall acceleration between the inlet and outlet of the turbine center frame.

In addition, airflow moving past an airfoil or splitter experiences a frictional drag loss that is known to be proportional to the flow velocity. The lower overall acceleration through the turbine center frame, as well as the lower airflow velocity at the leading edge of the splitter, can each provide for lower frictional drag losses compared to traditional turbine center frames, thereby improving engine performance. Aspects of the disclosure provide for low drag losses to be achieved without incurring penalties from turbulent/three-dimensional flows or undesirable flow interactions from the upstream high pressure turbine.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A turbine center frame for a turbine engine through which a flow path extends, the turbine center frame comprising an inner wall radially spaced from an outer wall, with the inner and outer walls extending between an inlet and an outlet, with the outlet downstream of the inlet with respect to the flow path, a set of circumferentially-spaced airfoils extending between the inner wall and the outer wall, a first cross-sectional area defined along the flow path between the inner and outer walls, a second cross-sectional area greater than the first cross-sectional area and defined along the flow path between the inner and outer walls downstream of the first cross-sectional area, and a third cross-sectional area defined along the flow path between the inner and outer walls downstream of the second cross-sectional area.

2. The turbine center frame of any preceding clause, further comprising a first height defined radially between the inner and outer walls at least partially forming the first cross-sectional area, a second height, larger than the first height, defined radially between the inner and outer walls at least partially forming the second cross-sectional area, and a third height, greater than or equal to the first height, defined radially between the inner and outer walls at least partially forming the third cross-sectional area.

3. The turbine center frame of any preceding clause, further comprising a splitter extending from one of the outer wall or the inner wall and positioned circumferentially between adjacent airfoils in the set of airfoils.

4. The turbine center frame of any preceding clause wherein the second height is defined at a leading edge of the splitter.

5. The turbine center frame of any preceding clause wherein the second cross-sectional area is at least partially defined at the leading edge of the splitter.

6. The turbine center frame of any preceding clause wherein the splitter comprises a splitter trailing edge located upstream of a trailing edge of an airfoil in the set of airfoils.

7. The turbine center frame of any preceding clause wherein the first height is defined at a leading edge of an airfoil in the set of airfoils.

8. The turbine center frame of any preceding clause wherein the leading edge of the airfoil is located at the inlet to the turbine center frame.

9. The turbine center frame of any preceding clause wherein the third height is located at the outlet to the turbine center frame.

10. The turbine center frame of any preceding clause wherein an airfoil in the set of airfoils comprises a leading edge located downstream of the inlet to the turbine center frame.

11. The turbine center frame of any preceding clause wherein the airfoil in the set of airfoils further comprises a trailing edge located upstream of the outlet to the turbine center frame.

12. The turbine center frame of any preceding clause wherein at least one of the inner or outer walls further comprises at least one local contour forming at least one of the first, second, or third cross-sectional areas.

13. The turbine center frame of any preceding clause wherein the second cross-sectional area defines a maximum cross-sectional area within the turbine center frame.

14. A turbine engine, comprising an engine core including a compressor section, a combustion section, and a turbine section in axial flow arrangement defining a flow path, with the turbine section including a high pressure turbine and a low pressure turbine, and a turbine center frame extending from the high pressure turbine to the low pressure turbine, the turbine center frame comprising an inner wall radially spaced from an outer wall, with the inner and outer walls extending between an inlet and an outlet, with the outlet downstream of the inlet with respect to the flow path, a set of circumferentially-spaced airfoils extending between the inner wall and the outer wall, a first cross-sectional area defined radially between the inner and outer walls, a second cross-sectional area larger than the first cross-sectional area and defined radially between the inner and outer walls downstream of the first cross-sectional area, and a third cross-sectional area defined radially between the inner and outer walls downstream of the second cross-sectional area.

15. The turbine engine of any preceding clause, further comprising a first height defined perpendicularly to the flow path between the inner and outer walls at least partially forming the first cross-sectional area, a second height, larger than the first height, defined perpendicularly to the flow path between the inner and outer walls at least partially forming the second cross-sectional area, and a third height, larger than the second height, defined perpendicularly to the flow path between the inner and outer walls at least partially forming the third cross-sectional area.

16. The turbine engine of any preceding clause, further comprising a splitter extending from one of the outer wall or the inner wall and positioned circumferentially between adjacent airfoils in the set of airfoils.

17. The turbine engine of any preceding clause wherein the second height is defined at a leading edge of the splitter, and wherein the first height is located at the inlet to the turbine center frame.

18. The turbine engine of any preceding clause wherein at least one of the inner or outer walls further comprises at least one local contour forming at least one of the first, second, or third cross-sectional areas.

19. A method of modifying an airflow along a flow path extending through a turbine center frame for a turbine engine, the method comprising directing the airflow along the flow path at a first velocity through a first cross-sectional area of the turbine center frame, slowing the airflow to a second velocity, less than the first velocity, by flowing the airflow through a second cross-sectional area of the turbine center frame greater than the first cross-sectional area, and speeding up the airflow to a third velocity, greater than the second velocity, by flowing the airflow through a third cross-sectional area of the turbine center frame.

20. The method of any preceding clause, further comprising dividing the airflow past a splitter located along the flow path.

21. The method of any preceding clause wherein the slowing the airflow further comprises flowing the airflow along the flow path at the second velocity past a leading edge of an airfoil within the turbine center frame.

22. The method of any preceding clause wherein the speeding up the airflow further comprises speeding up the airflow to the third velocity at an outlet to the turbine center frame.

23. The method of any preceding clause wherein the slowing the airflow to the second velocity further comprises slowing the airflow to a minimum velocity within the turbine center frame by flowing the airflow through a maximum cross-sectional area within the turbine center frame.

What is claimed is:

1. A turbine center frame for a turbine engine through which a flow path extends, the turbine center frame comprising:
   an inner wall radially spaced from an outer wall, with each of the inner wall and the outer wall extending between an inlet and an outlet, with the outlet downstream of the inlet with respect to the flow path;
   a set of circumferentially-spaced airfoils extending between the inner wall and the outer wall;
   a splitter extending from one of the outer wall or the inner wall and positioned circumferentially between adjacent airfoils in the set of airfoils;
   a first cross-sectional area defined along the flow path between the inner wall and the outer wall;
   a second cross-sectional area greater than the first cross-sectional area and defined along the flow path between the inner wall and the outer wall at a leading edge of the splitter;
   a third cross-sectional area defined along the flow path between the inner wall and the outer wall downstream of the second cross-sectional area; and
   a fourth cross-sectional area defined along the flow path between the inner wall and the outer wall downstream of the third cross-sectional area, wherein the fourth cross-sectional area is between 1 and 3 times the first cross-sectional area.

2. The turbine center frame of claim 1, further comprising:
   a first height defined radially between the inner wall and the outer wall at least partially forming the first cross-sectional area;
   a second height, larger than the first height, defined radially between the inner wall and the outer wall at least partially forming the second cross-sectional area; and
   a third height, greater than or equal to the first height, defined radially between the inner wall and the outer wall at least partially forming the third cross-sectional area.

3. The turbine center frame of claim 2 wherein the second height is defined at a leading edge of the splitter.

4. The turbine center frame of claim 3 wherein the second cross-sectional area is at least partially defined at the leading edge of the splitter.

5. The turbine center frame of claim 2 wherein the splitter comprises a splitter trailing edge located upstream of a trailing edge of an airfoil in the set of airfoils.

6. The turbine center frame of claim 2 wherein the first height is defined at a leading edge of an airfoil in the set of airfoils.

7. The turbine center frame of claim 6 wherein the leading edge of the airfoil is located at the inlet to the turbine center frame.

8. The turbine center frame of claim 2 wherein the third height is located at the outlet to the turbine center frame.

9. The turbine center frame of claim 1 wherein an airfoil in the set of airfoils comprises a leading edge located downstream of the inlet to the turbine center frame.

10. The turbine center frame of claim 9 wherein the airfoil in the set of airfoils further comprises a trailing edge located upstream of the outlet to the turbine center frame.

11. The turbine center frame of claim 1 wherein at least one of the inner wall or the outer wall further comprises at least one local contour forming at least one of the first, second, or third cross-sectional areas.

12. The turbine center frame of claim 1 wherein the second cross-sectional area defines a maximum cross-sectional area within the turbine center frame.

13. A turbine engine, comprising:
   an engine core including a compressor section, a combustion section, and a turbine section in axial flow arrangement defining a flow path, with the turbine section including a high pressure turbine and a low pressure turbine; and
   a turbine center frame extending from the high pressure turbine to the low pressure turbine, the turbine center frame comprising:
      an inner wall radially spaced from an outer wall, with the inner wall and the outer wall extending between an inlet and an outlet, with the outlet downstream of the inlet with respect to the flow path;

a set of circumferentially-spaced airfoils extending between the inner wall and the outer wall;

a splitter extending from one of the outer wall or the inner wall and positioned circumferentially between adjacent airfoils in the set of airfoils;

a first cross-sectional area defined radially between the inner wall and the outer wall;

a second cross-sectional area larger than the first cross-sectional area and defined radially between the inner wall and the outer wall at a leading edge of the splitter;

a third cross-sectional area defined radially between the inner wall and the outer wall downstream of the second cross-sectional area; and a fourth cross-sectional area defined along the flow path between the inner wall and the outer wall downstream of the third cross-sectional area, wherein the fourth cross-sectional area is between 1 and 3 times the first cross-sectional area.

14. The turbine engine of claim 13, further comprising:

a first height defined perpendicularly to the flow path between the inner wall and the outer wall at least partially forming the first cross-sectional area;

a second height, larger than the first height, defined perpendicularly to the flow path between the inner wall and the outer wall at least partially forming the second cross-sectional area; and a third height, larger than the second height, defined perpendicularly to the flow path between the inner wall and the outer wall at least partially forming the third cross-sectional area.

15. The turbine engine of claim 14 wherein the second height is defined at a leading edge of the splitter, and wherein the first height is located at the inlet to the turbine center frame.

16. The turbine engine of claim 13 wherein at least one of the inner wall or the outer wall further comprises at least one local contour forming at least one of the first, second, or third cross-sectional areas.

17. A method of modifying an airflow along a flow path extending through a turbine center frame for a turbine engine, the method comprising:

directing the airflow along the flow path at a first velocity through a first cross-sectional area of the turbine center frame;

slowing the airflow to a second velocity, less than the first velocity, by flowing the airflow through a second cross-sectional area of the turbine center frame greater than the first cross-sectional area; and speeding up the airflow to a third velocity, greater than the second velocity, by flowing the airflow through a third cross-sectional area of the turbine center frame;

wherein the third velocity is between 80% and 125% of the first velocity.

18. The method of claim 17 wherein the slowing the airflow further comprises flowing the airflow along the flow path at the second velocity past a leading edge of an airfoil within the turbine center frame.

* * * * *